United States Patent [19]
Lo

[11] Patent Number: 5,872,089
[45] Date of Patent: Feb. 16, 1999

[54] DESCALANT COMPRISING STRUCTURED LIQUID OR SOLID

[75] Inventor: Shui-Yin Lo, Pasadena, Calif.

[73] Assignee: American Technologies Group, Inc., Monrovia, Calif.

[21] Appl. No.: 587,880

[22] Filed: Jan. 18, 1996

[51] Int. Cl.⁶ ........................................................ C02F 5/08
[52] U.S. Cl. ................... 510/247; 510/109; 510/405; 510/418; 510/445; 209/1; 209/155; 252/175; 210/696
[58] Field of Search ...................................... 510/109, 180, 510/181, 191, 218, 220, 221, 224, 235, 238, 239, 240, 241, 242, 245, 247, 276, 298, 295, 337, 362, 370, 396, 405, 418, 445; 8/137; 209/1, 2, 3, 155; 252/175; 210/696

[56] References Cited

U.S. PATENT DOCUMENTS

| | | | |
|---|---|---|---|
| 5,074,083 | 12/1991 | Kanno et al. | 51/410 |
| 5,205,957 | 4/1993 | Van de Pas | 510/397 |
| 5,523,013 | 6/1996 | Durbut et al. | 510/235 |
| 5,529,724 | 6/1996 | Falk | 510/417 |

FOREIGN PATENT DOCUMENTS 79646  5/1983  European Pat. Off. .

*Primary Examiner*—Alan Diamond
*Attorney, Agent, or Firm*—Harris F. Brotman

[57] ABSTRACT

A descalant means, comprising $L_E$ structured liquid crystals which when placed close to, or into a liquid stream, cause the formation of microscopic liquid crystalline structures, which act as nucleation sites for the formation of crystal structures of normally liquid-soluble or insoluble salts, and other suspended particles, these crystalline structures being chemically stable and causing a large reduction in the scaling potential of the liquid, thereby avoiding scale buildup on metal or other containment surfaces and also initiating descaling of surfaces already containing scale buildup. Furthermore, said means will reduce the amount of detergents, soaps, surfactants and polymers required in washing and other forms of water use.

19 Claims, 7 Drawing Sheets

FIG. 4
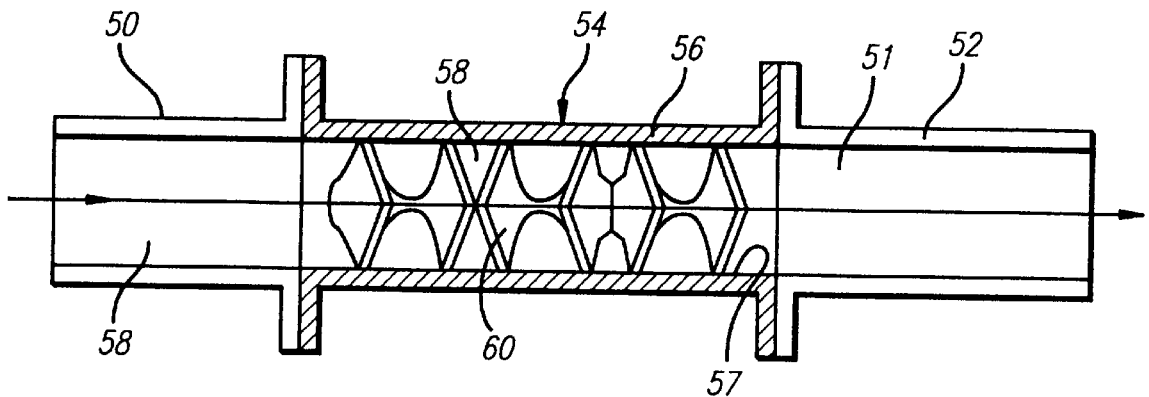
FIG. 5
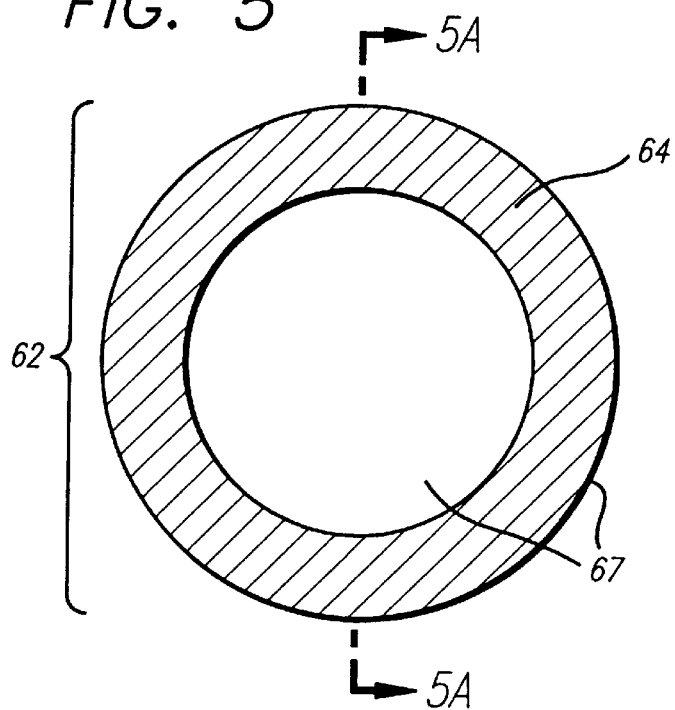
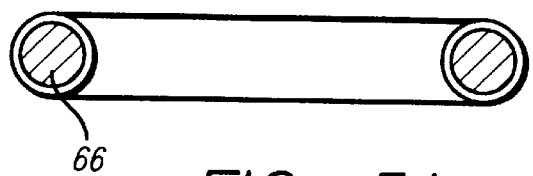
FIG. 5A

DESCALANT COMPRISING STRUCTURED LIQUID OR SOLID

BACKGROUND—CROSS REFERENCE TO RELATED INVENTIONS

Four earlier inventions by the same inventor have been filed as follows:
1. "Growing structures around charged particles and increasing the concentration." File No: 08/182,410.
2. "Growing structures around charged particles from a structured liquid and increasing the strength of the structured liquid.." File No: 08/217,042
3. "Enhancing biological, biochemical and chemical reactions using structured liquids and solids." Patent application submitted Oct. 1995, Ser. No. 08/520,636.
4. "A combustion enhancing fuel additive comprising microscopic water structures." Patent application submitted Nov. 1995, Ser. No. 08/558,330.

1. Background—Field of the Invention

The invention relates to a device for reduction of scaling or scale buildup in liquids, water and oil transport systems and specifically, to a device which does not add chemicals, but instead utilizes micron-sized or smaller crystalline structures within the transported liquid, water or oil. The scaling components present, such as salts of calcium and magnesium in water and paraffins in the case of oil, are attracted to the crystalline structures in the liquid which serve as nucleation points, instead of depositing on the inner surfaces of pipes, vessels and other equipment. Thus the potential for scaling deposits is greatly reduced.

2. Background—Description of Prior Art

The current state of the art used to reduce scale buildup in pipes and other liquid conveyance systems makes use of selected chemicals which are added to and mixed into the liquid in metered, small amounts. These chemicals inhibit the formation of scale or other deposits on the insides of the conveyance system. The main disadvantage of the use of chemicals is their costs as well as the need to meter the quantity being introduced and to vary that amount as the scaling material quantities vary in the stream.

These chemicals may, in turn cause problems with later chemical processes or have to be removed or neutralized.

OBJECTS AND ADVANTAGES OF THE INVENTION

Accordingly, besides the objects and advantages of the descaling device described in my above patent, several objects and advantages of the present invention are:

(a) To provide a non-chemical means of reducing the tendency of hard water or other liquid to cause scale buildup on pipes and other equipment.

(b) To provide a device which can be attached to the outside surface of an existing water or oil transport system to create structures in the water or oil system, which bind up and essentially neutralize hardness ions such as calcium and magnesium in the case of water and paraffins and waxes in the case of oil.

(c) To provide an environmentally non-polluting means for removing scale or buildup, from water or oil transport equipment without the use of chemicals.

(d) To provide a low-cost, safe, easily installed scale inhibiting and descaling means.

(e) To provide a scale inhibiting and descaling means that does not have to come in contact with the water being treated, thereby allowing the means to be installed on the outside of pipes, and tanks, without cutting into the existing pipeline system.

(f) To provide a scale inhibiting and descaling means for removing scale in any liquid transport system, such as mineral deposits in the case of water and paraffin and waxes in the case of oil.

BRIEF DESCRIPTION OF THE FIGURES

Note: Definitions for various specialized terms are included here for clarification.

$I_E$ stands for ice formed under a strong electric field.

$I_E$-structured water is one specific case of the general class of $L_E$-structured liquids that is formed from water molecules. This is water that contains $I_E$ crystals, sometimes called $I_E$ structures. These structures are obtained by homeopathic methods or ways and means as described in my previous patent applications as listed on page 2. The theoretical idea is that water molecules from an electric dipole with an electric dipole moment of 2.9 Debye. Under suitable conditions these water molecules will cluster to form crystal-like structures in the nanometer to micron size range. These clusters would also be expected to have a strong electric dipole moment.

$L_E$-structured liquid is a general liquid where $I_E$ structure is one special case. The liquid can be water, alcohol, oil or any other di-electric liquid. Inside this liquid there are structures created by the electric dipole nature of the molecules. This also includes the hybrid case of alcohol/water solutions containing $I_E$ crystals, which are made up of water molecules. $L_E$-structure specifically means that the structure is induced in the liquid by strong electric fields which can also come from the electric field of an ion or from the dipole moment of molecules. In this case L stands for liquid.

$S_E$-structured solid is broadly defined as the structured solids that are formed under a strong electric field and also those that are prepared by the methods defined in the earlier inventions in my patent application Ser. Nos. 08/182,410 and 08/217,042 listed above on page 2. $L_E$-crystal is actually a specific case of an $S_E$ solid, where the S stands for solid.

Scaling is the excessive deposition and buildup of water-soluble and insoluble materials on the inner surface of pipes, ducts, tanks and other means of water conveyance, heat transfer and storage. For other liquids such as oil, the scaling may be composed of paraffin and other solids.

Figure 1:
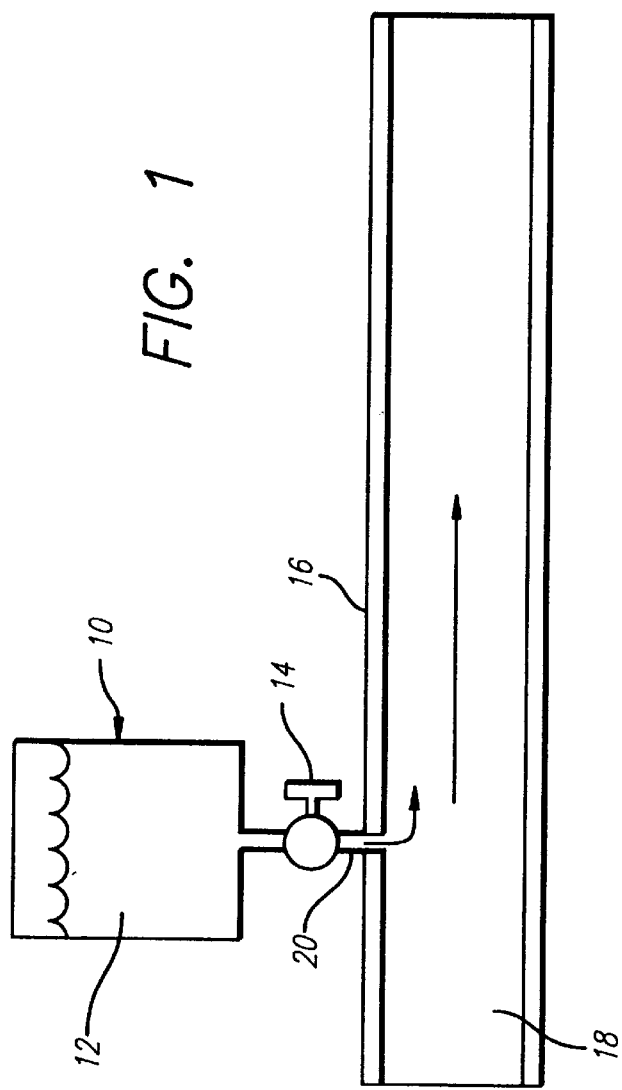

A brief description of the Figures follows:

FIG. 1 is a drip-feed device for feeding $I_E$ structured water into a liquid.

Figure 2C:
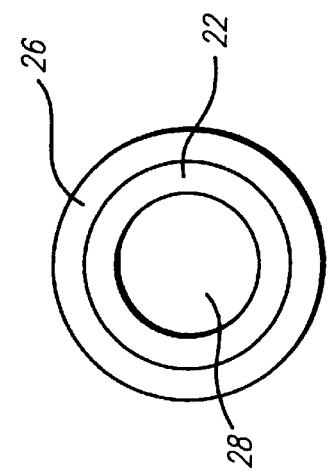
Figure 2A:
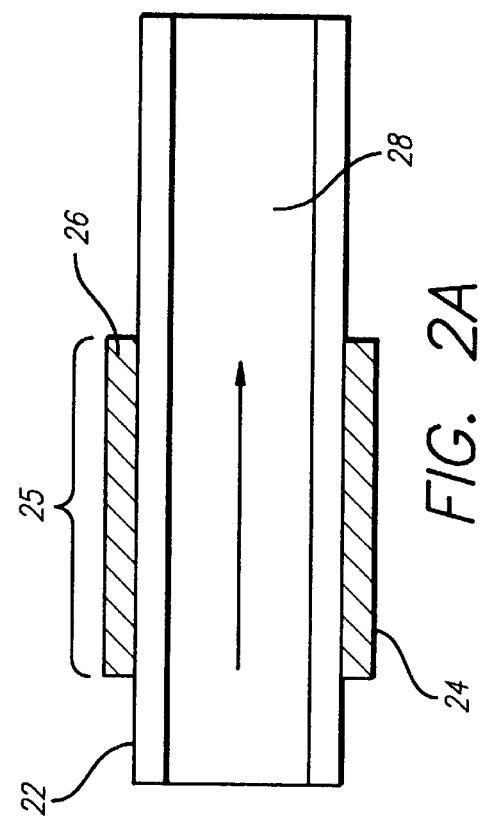

FIG. 2A is a pipe mounted clamp-on device, made of $S_E$ solids for inducing $I_E$ structures in the liquid passing through the pipe.

Figure 2B:
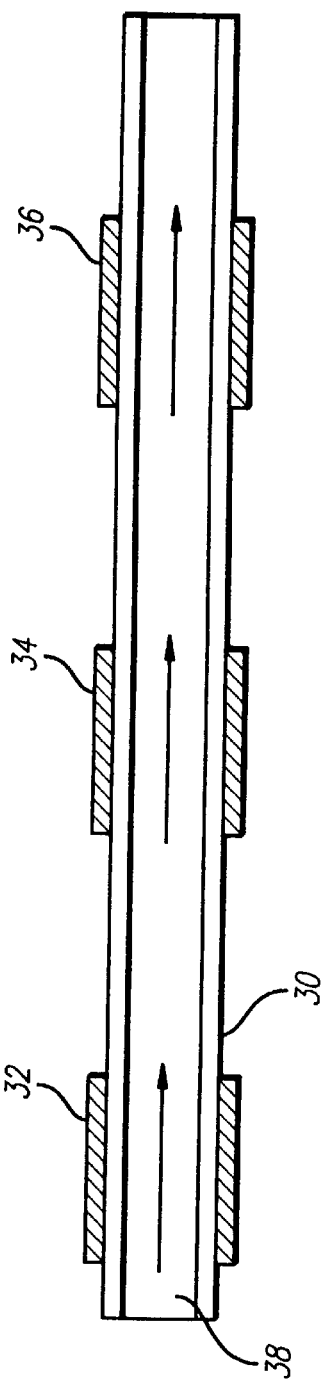

FIG. 2B shows multiple pipe mounted clamp-on devices, made of $S_E$ solids for inducing $I_E$ structures in the liquid passing through the pipe.

FIG. 2C shows a cross section view of a pipe mounted clamp-on device.

Figure 3:
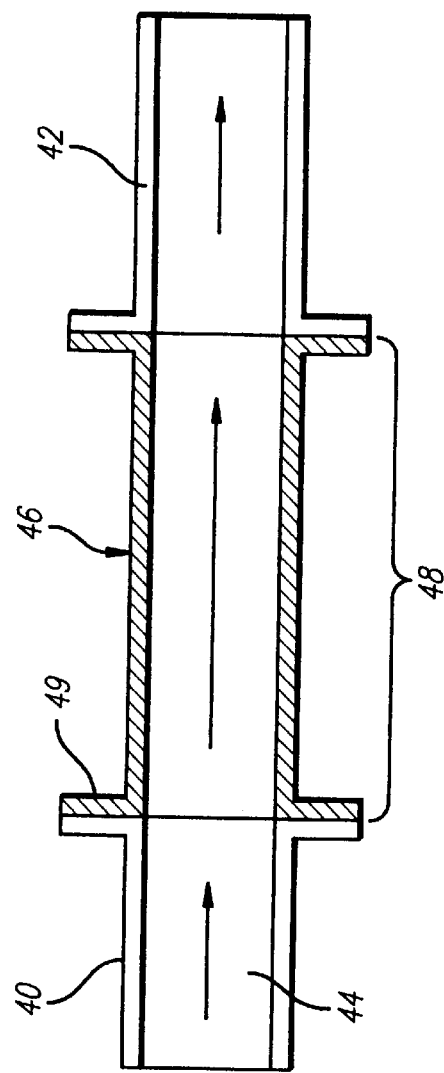

FIG. 3 shows a system where the $S_E$ solids are formed into a pipe section, with attachment flanges for installation into a pipe system.

Figure 3A:
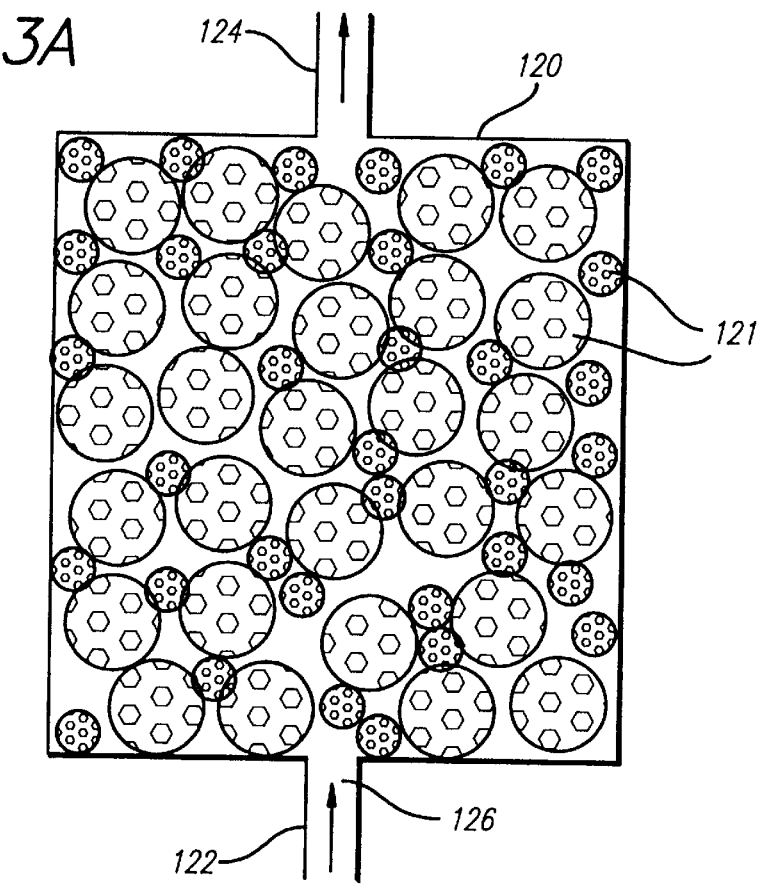

FIG. 3A shows a system where the $S_E$ solids are placed in a through-flow tank.

Figure 3B:
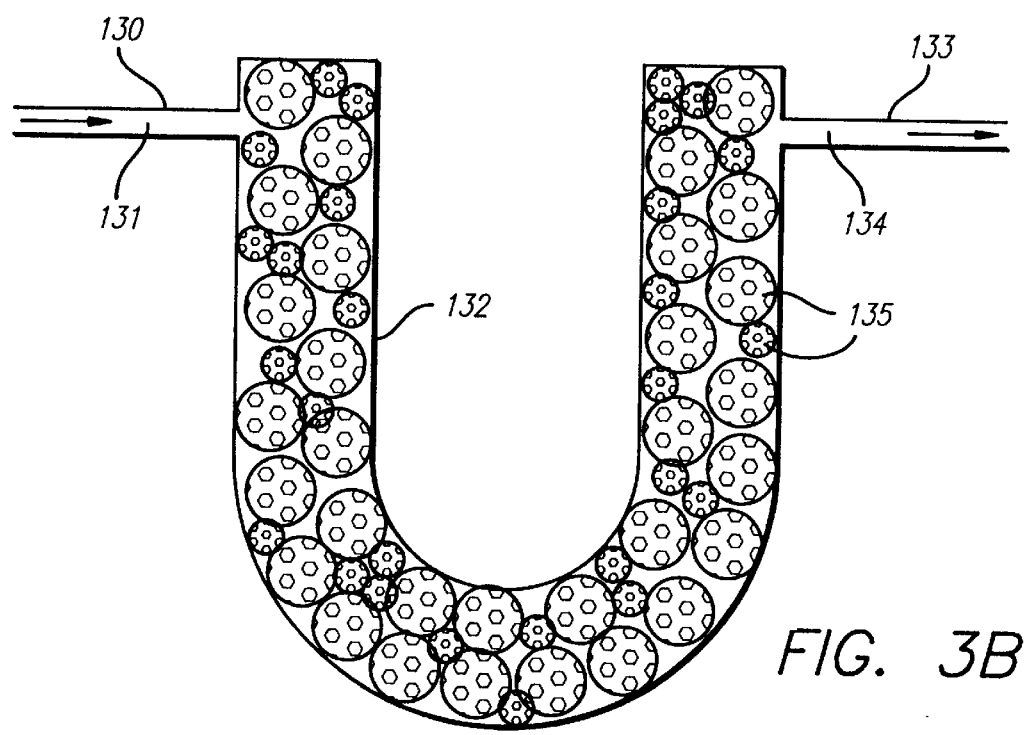

FIG. 3B shows a device where the $S_E$ solids are contained in a through-flow tube.

FIG. 4 shows a static mixer installed inside a $S_E$ solid tube device used to enhance turbulence and hence structuring in the liquid passing through the pipe.

FIG. 5 shows a floating device with a permeable surface, which induces $I_E$ structures in the liquid being treated.

FIG. 5A shows a cross section view of a floating device.

Figure 6:
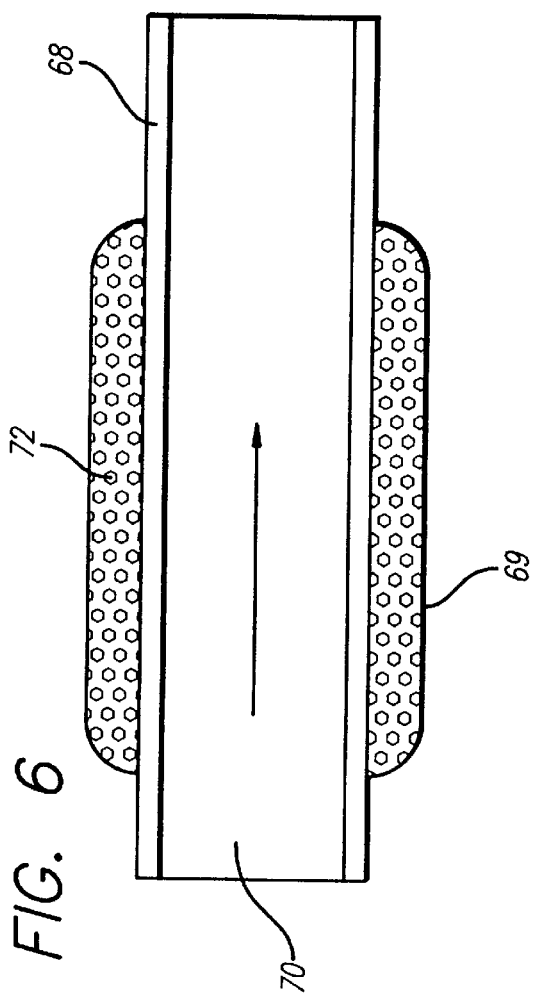

FIG. 6 shows a painted-on, $S_E$ impregnated epoxy or other paintable material device which can be applied over any length of the surface of the pipe carrying the liquid being structured.

Figure 7:
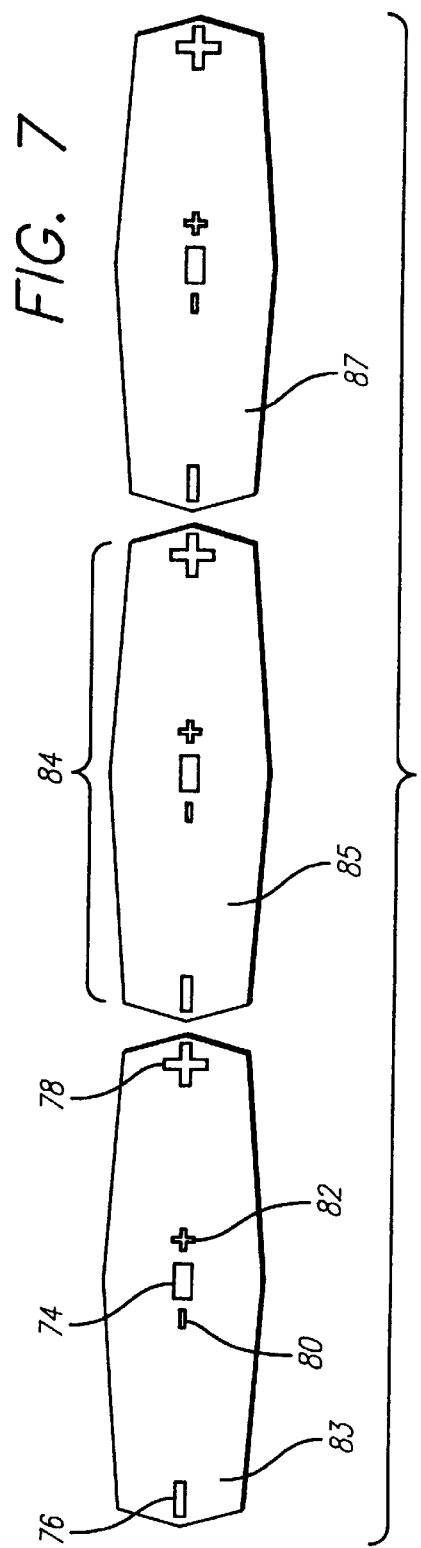

FIG. 7 shows the relative size of $I_E$ structures and calcium carbonate crystals.

Figure 8:
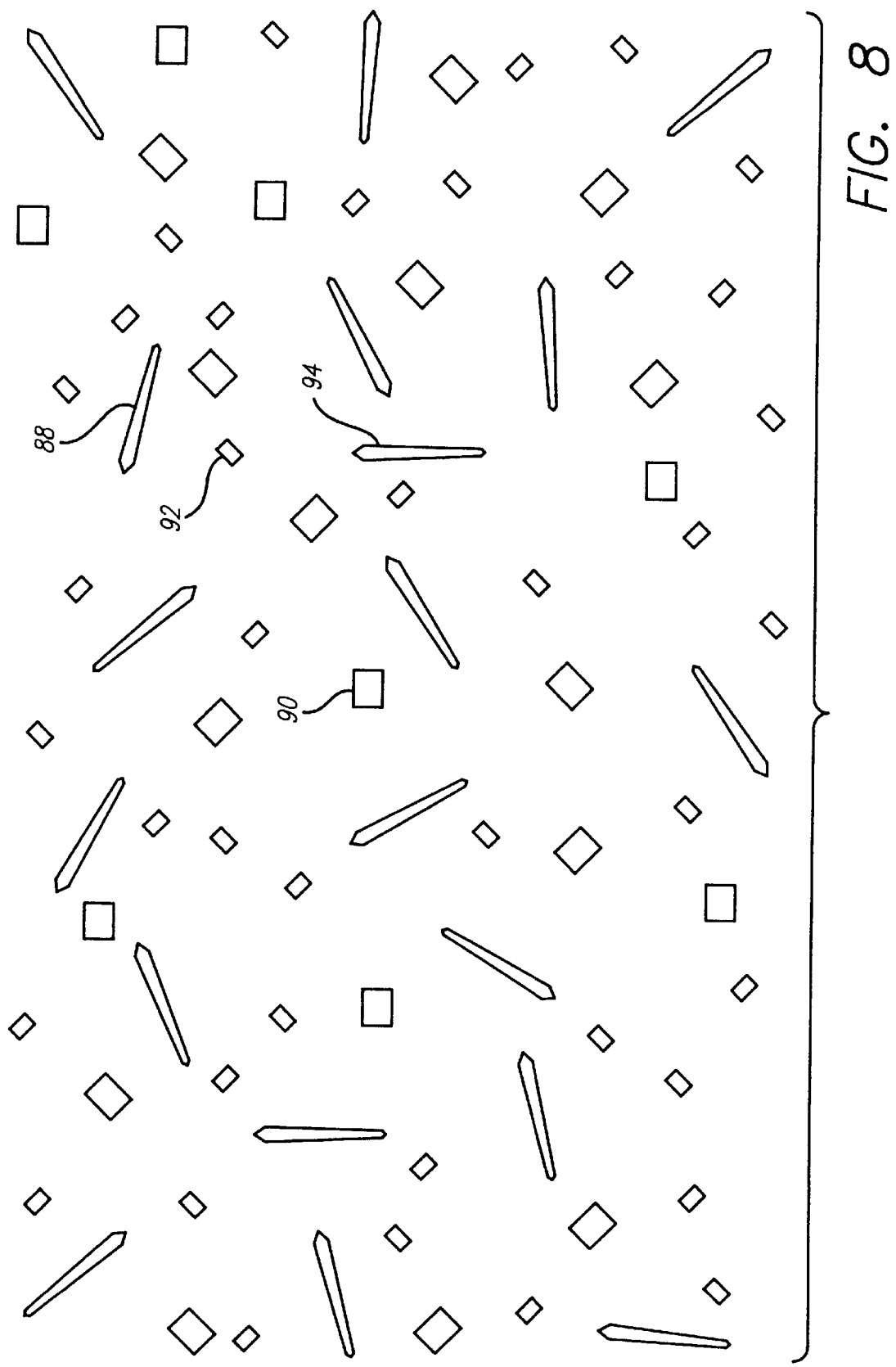

FIG. 8 shows the formation of normal hard water crystal deposits on a glass slide.

Figure 9:
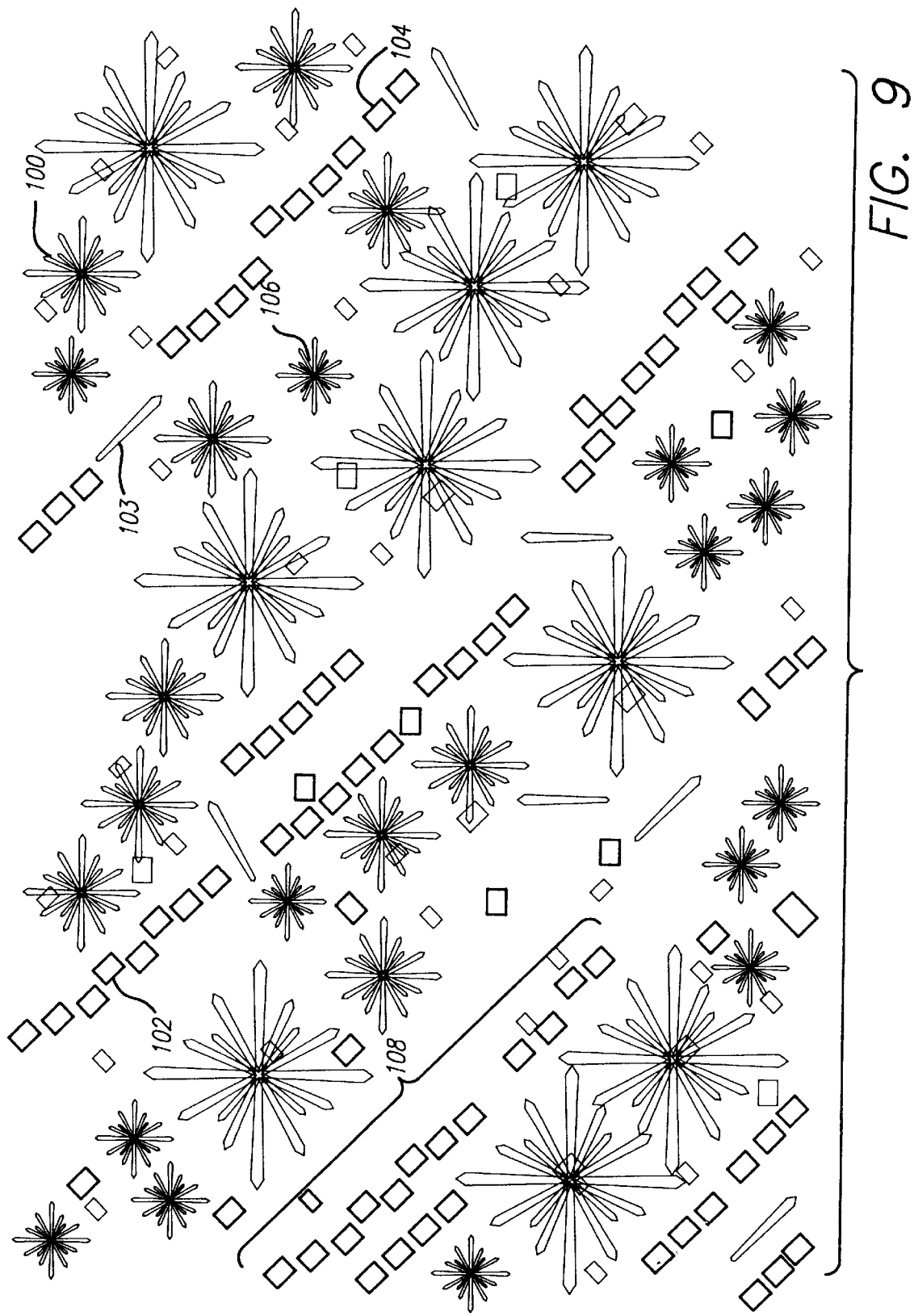

FIG. 9 shows the formation of 'starbursts' of normal hard water crystal deposits on a glass slide around the $I_E$ structures induced in the water by one form of the present invention.

Figure 10:
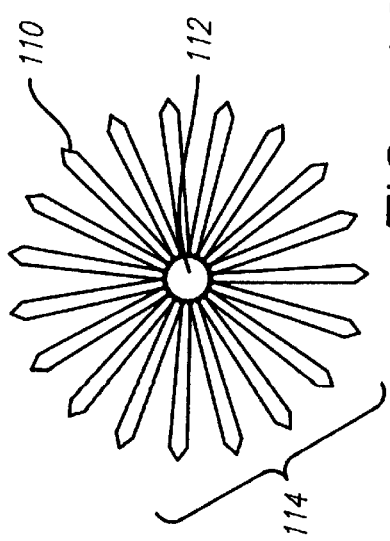

FIG. 10 shows one typical starburst crystal that forms in hard water dried on a glass slide.

DETAILED DESCRIPTION OF THE FIGURES

FIG. 1 is a drip-feed device for feeding $I_E$ water into hard water or other liquid being treated. The device consists of a tank (10) containing a structured liquid (12) with a feed tube (20) and a control valve (14). The device is attached to the pipe (16) containing the liquid to be treated (18).

FIG. 2A shows a pipe mounted clamp-on device (25), made of $S_E$ solids (26) inside a container (24). The device induces $I_E$ structures in the liquid (28) passing through the pipe (22).

FIG. 2B shows a series of clamp-on devices (32), (34) and (36) connected to a pipe (30) containing the liquid (38) to be structured.

FIG. 3 shows a structured $S_E$ solid (48) made into a pipe section (46) with flanges or other means of attachment (49) attached to pipes (40) and (42) which contain the liquid to be structured (44).

FIG. 3A shows $S_E$ solids (121) placed in a tank (120) and the liquid to be structured (126) enters through pipe (122) and mixes by close contact with the $S_E$ solids (121) and becomes structured, then passes out through the exit pipe (124).

FIG. 3B shows a device where the $S_E$ solids (135) are contained in a tube (132) and the liquid (131) enters through pipe (130) and gets into close contact with the solids (135) then exits through pipe (133) as structured liquid (134).

FIG. 4 shows a static mixer device used to enhance turbulence in the liquid being structured. The liquid (58) enters through pipe (50) passes through static mixer (60) which increases the turbulence in the liquid (58) forcing it into close contact with the tube surface (57). The static mixer (60) is contained within tube (54) which contains structured solid $S_E$ (56). The high turbulence in the liquid (58) enhances the structuring effect of the $S_E$ solid (56) by bringing more of the liquid into close contact with the tube ((54). The structured liquid (51) then exits through pipe (52).

FIG. 5 shows a floating device (62) which induces $I_E$ structures in the liquid being treated. The device consists of a porous surface (64) allowing the liquid (67) to come in contact with the $S_E$ solids (66), thus inducing structures in the liquid.

FIG. 6 shows a paint-on device which can be applied to the surface of the pipe carrying the liquid being structured. The pipe (68) containing the liquid (70) is coated on the outside with a paint (69) containing structured solid (72). The liquid passing through the pipe (68) becomes structured.

The length of the paint layer can be of any length as required to create the desired structuring.

FIG. 7 shows the relative size of $I_E$ structures and calcium carbonate crystals. The $I_E$ structures (74) have a positive (82) and negative (80) charge. These charges induce corresponding charges (76) and (78) in the calcium carbonate crystal (83). The size of the $I_E$ structure (74) is about 20 nanometers (nm), while the size of a calcium carbonate crystal (83) is about 20 microns.

FIG. 8 shows the formation of normal hard water crystals on a glass slide. There are two basic forms of crystal formed, the first is needle shaped crystals (88) and (94) and the second is cube shaped crystals (90) and (92). There is no alignment of the crystals as they are placed randomly over the surface of the slide.

FIG. 9 shows the formation of 'starbursts' (100) and (106) consisting of calcium carbonate crystals which grow around the $I_E$ structures induced in the water by one form of the present invention. In the presence of the tiny $I_E$ structures, much larger crystals of hard water compounds such as calcium carbonate grow around the smaller $I_E$ crystals to form needle shaped (103) and cubic shaped (104) calcium carbonate/$I_E$ crystals. These calcium carbonate/$I_E$ crystals carry charge. Starbursts (100) and (106) are then formed due to the interaction of these calcium carbonate/$I_E$ crystals with other crystals in the liquid. Alignment occurs amongst these crystals and starbursts because of their charge and orderly crystal pattern lines (108) are created.

FIG. 10 shows one typical starburst crystal (114) that forms in hard water on a glass slide. The calcium carbonate needle $I_E$ crystals (110) form a star shape around the smaller calcium carbonate $I_E$ crystal (112) which is at the center of the starburst.

SUMMARY OF THE INVENTION

The present invention is in the form of metered structured liquids or devices as shown in FIGS. 1 through 6, comprising solids or liquids that contain the electric field of $I_E$ structures and which can create $I_E$ structures in water by direct injection of the structured water or liquid by placing the device at some distance from the water or liquid to be structured. To understand how this occurs the following discussion on the physics of the process is presented.

Structured water is water which is $I_E$-structured and has a strong electric dipole moment. These electric dipole moment structures can induce electric dipole moments in neutral molecules that move near them. The electric attractive force around the $I_E$ structures in the liquid draw neutral molecules toward the surface of the $I_E$ structures. The attraction is greater if the electric dipole moment of the $I_E$ structure is larger. The results of this attraction force is the creation of crystalline water structures which are submicron in size.

NARRATIVE DESCRIPTION OF THE INVENTION

The problem of scaling is well known in industry and has its origin in the dissolved solids that are commonly found in water. Water soluble minerals such as calcium, magnesium, potassium and others are leached out into ground water. These dissolved minerals then find their way into water used in many different kinds of domestic, industrial and commercial processes. Under certain conditions these minerals will come out of solution and deposit on surfaces to form a hard scale. The chemistry of scaling is well known and one simple chemical reaction involving calcium, which is the dominant one in scaling, is described as follows.

When water percolates through the ground, it picks up carbon dioxide and calcium carbonate according to the equation:

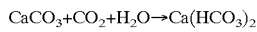

to form calcium bicarbonate which is soluble in water. This water is considered to be hard water which is delivered in pipes for use in home or industry. When this water is used with heating, such as in hot water service at home, or cooling towers or industrial boilers, chemical reactions will occur to produce solid calcium carbonate that is not soluble in water according to the following equation:

The calcium carbonate precipitates out of the water and builds up on heated surfaces as scale.

This scale reduces heat exchanger efficiency as well as reduces the flow rate through the pipe. Normally scaling is prevented through the use of chemicals. Chemicals are not desirable for environmental reasons and also some time these chemicals have undesirable side effects such as corrosion and erosion.

The invention as described in FIGS. 1 through 10 are means for injecting in or producing $I_E$ crystal structures in the liquid being treated. Once the $I_E$ crystals are injected or formed they act as a nucleus for supersaturated salts to crystallize. This has many applications in water treatment systems. For instance, it is well known that when water containing $CaCO_3$, a common water-soluble salt, is heated, the solubility of the $CaCO_3$ drops, thus pushing the solution towards saturation. In the case of boiler and heat exchanger systems, once the saturation point of the carbonate is reached, usually on the surface of the heat exchanger tubes, scale buildup occurs, resulting in a reduction of the heat exchanger efficiency and the need for periodic shutdown and boiler tube descaling to be done.

There are various solutions to this problem, such as the purification of the boiler feedwater to very high standards. This can be expensive and hard to maintain, requiring specialized equipment and continuous water quality monitoring and metering and mixing of descalant chemicals into the water stream to inhibit scale formation.

With the formation of $I_E$ crystals in the water, their high electric dipole act as nucleation points for mineral salt crystal formation. The calcium carbonate will form crystals around the $I_E$ crystals which will be in suspension in the water. In standard water systems, the nucleation point will be on the surface of the pipe or heated container for the calcium carbonate to cluster around. By placing a device such as is shown in FIGS. 1 through 6, in the flow system, scaling is greatly reduced.

The scale-forming salts are not removed but they are physically bound up within the water volume and are made inactive. Analysis of the water sample will show that the salts are still present, however they no longer contribute to the normal scaling of the water. Thus the solid calcium carbonate will flow with the water rather than stick to the metal surfaces of the pipe, hence no scale is formed. The invention as shown in devices illustrated in FIGS. 1 through 6 offer an inexpensive solution to a world-wide problem. By the application of a device locally on the pipe or duct carrying the water to be treated, scale inhibition results.

The same means as illustrated in FIGS. 1 through 6, would descale surfaces which are already scaled in the following manner. The $I_E$ crystals will attract calcium carbonate in water to form crystals around it so the water will contain almost no calcium carbonate, however calcium carbonate does dissolve to a small amount in water hence the scale on the metal surfaces will start dissolving into the water and become less and less on the metal surface whereas more and more will form around the $I_E$ crystals.

There are two basic ways to introduce $I_E$ crystals in the pipe. The first is by actual dripping in a concentrated solution of $I_E$ crystals as shown in FIG. 1 and the second is by the formation of $I_E$ crystals within the water by an external means as shown by FIGS. 2 through 6.

For the first case, the method is covered in patent application Ser. Nos. 08/182,410 and 08/217,042 for the formation of $I_E$ crystals within water and other liquids. The concentrated $I_E$ structured water is only a very small fraction of the total amount of water. A typical example is 1 part per million (ppm). In structured water the majority of $I_E$ crystals are in the order of 10 nm in size, whereas from experiment we know that the calcium carbonate crystals are in the order of 10 microns in size. If one calcium carbonate crystal grows on one $I_E$ crystal, the volume ratio is $1000^3$ or $10^9$. Theoretically only one billionth of the amount of calcium carbonate is needed of $I_E$ crystals in volume. So for conservative solutions, 1 to 1 million is chosen as the ratio of $I_E$ crystals to calcium carbonate crystals in hard water, to do the job.

The second method uses the fact that structures can be induced in a liquid some distance away from the structure source. This is because the electromagnetic field emitted by the oscillation of the electric dipole moment of the $I_E$ or $S_E$ crystals, which comes from thermal energy, is transmitted to the liquid. The ions in the liquid are creating and destroying $I_E$ crystal unit cells around them. These unit cells will act like antennae and receive the electromagnetic field from the previously mentioned $I_E$ or $S_E$ crystals. Then they are shaken loose from the ions to form independent $I_E$ crystals which are stable. Thus new $I_E$ crystals can be induced into a liquid which comes into proximity of other $I_E$ or $S_E$ crystals. This effect is enhanced by forcing turbulence into the liquid being treated as more of the liquid is brought into close contact as shown by the device in FIG. 4.

There are a number of ways in which the invention may be used to prevent scaling. As an $S_E$ crystal it can be made in the form of finely ground quartz and mixed into paint and painted onto the surface of a pipe or channel along which the water to be treated flows, as shown in FIG. 6. The solid quartz form can also be placed inside a tube and the tube wrapped around the pipe or channel containing water to be treated, or the quartz can be fused into a solid form and clamped around the pipe or channel as shown in FIGS. 2A and 2B.

In the $L_E$ liquid form, it can be metered into the pipe or channel as shown in FIG. 1, and mixed directly with the water to be treated. Or it can be placed inside the pipe in a container, allowing the water to be treated to flow around the outside of the container, or the container can be made integral with the pipe and form a pipe section as shown in FIGS. 3 and 4, through which the water flows. These are some and by no means all the possible ways that the structured solid or liquid can be placed in proximity with the water to be treated in order to create the desired effect on the water ion constituents.

Applications for the invention are many and not limited to the following examples; washing machines and dishwaters in homes to replace or reduce the amount of soaps and detergents, in oil production to inhibit the scale buildup that occurs from produced water, in batteries to increase life by reducing the scale buildup on electrodes, in agriculture for the inhibition of scale buildup in watering systems including the pipes and nozzles, in washing systems such as a car wash for the inhibition of unsightly scale deposit on the car's paintwork, upstream of a water treatment clarifier for the faster removal of precipitates in the settling section, also upstream of a clarifier, where the ions which normally would pass through the clarifier, are precipitated out, in cooling towers for reduction of scale, in boilers for the reduction of scale in boiler tubes and heat exchanger tubes, and in distillers for the reduction of scale buildup.

CONCLUSION, DISCUSSION AND RAMIFICATIONS

Accordingly, the reader will see that $L_E$ structures can be added to liquids to prevent scale from building up on the surface of components used in a wide variety of systems, both industrial and commercial. In addition, when a $L_E$ or $S_E$ structured liquid or solid is placed in proximity with a sample of the liquid, either in a container or flowing along a pipe, $L_E$ structures are induced in the liquid which in turn, will encourage scale-forming materials to collect around the $L_E$ structure, thus tying it up, reducing the scaling potential by blocking the material from depositing onto surfaces. The use of these $L_E$, $I_E$ and $S_E$ structures replaces the need for scale inhibiting chemicals and offers a cheaper and environmentally acceptable alternative to chemical addition. It further allows the use of water contaminant levels that normally would not be acceptable. Furthermore, the flexibility of the technology of producing structures allows the designing of a wide variety of devices or means to create structures in water and other liquids, which will meet the specific requirements of a particular application.

Although the description above contains many specificities these should not be construed as limiting the scope of the invention, but as merely providing illustrations of some of the presently preferred embodiments of this invention. For example, the devices and means described to create structure in liquids can be formed into spheres, triangles, cubes or any other solid shape. They can be packaged in cylinders, or packed into tubes and wrapped around the pipe containing the liquid to be structured, or made into beads and packed into tubes or tanks for the liquid to percolate through. Or the structured liquid can be metered into the mainflow of the liquid being treated.

Thus the scope of the invention should be determined by the appended claims and their legal equivalents, rather than the examples given.

We claim:

1. A method of prevention and removal of scale from a potentially scale-forming solution which comprises injecting an $L_E$ structured liquid into said potentially scale-forming solution.

2. The method as in claim 1, wherein said $L_E$ structured liquid is $I_E$ structured water.

3. The method as in claim 2, wherein said potentially scale-forming solution is in a heat exchanger which is used in a cooling tower, boiler, condenser or distiller.

4. The method as in claim 2, wherein said potentially scale-forming solution is a liquid being transported in a water pipe or oil pipe.

5. A method of removing and prevention of scaling in a liquid which potentially can form scale deposits which comprises bringing said liquid into close proximity with an $S_E$ structure solid.

6. The method as in claim 5, wherein said $S_E$ structured solid is in the form of a tube, bead or a tank.

7. The method as in claim 6, wherein said liquid which can potentially form scale deposits is in the form of a solution, and the $S_E$ structured solid floats on top of the solution in a floatation device.

8. The method as in claim 5, wherein said liquid is in a container, tank, a tube or a pipe, and the $S_E$ structured solid is in the form of a paint applied on the outside surface of the container, tank, tube or pipe.

9. The method as in claim 5, wherein said liquid which can potentially form scale deposits is in the form of a solution, and the $S_E$ structured solid is in a container in said solution.

10. A method of preventing and removal of scale in a solution which comprises bringing an $L_E$ structured liquid contained in a container into direct contact with said solution.

11. A method of reducing the amount of detergent, soap, surfactant or polymer needed in a solution used for washing, removal of particulates or separation of solids from liquids, which comprises adding $L_E$ structured liquid to the solution.

12. The method as in claim 11, wherein said $L_E$ structure liquid is $I_E$ structured water.

13. A method of reducing the amount of detergent, soap, surfactant or polymer needed in a solution used for washing, removal of particulates or separation of solids from liquids, which comprises bringing an $S_E$ structured solid in contact with the solution.

14. A method of reducing the amount of detergent, soap, surfactant or polymer needed in a solution used for washing, removal of particulates or separation of solids from liquids, which comprises bringing an $S_E$ structured solid in a container into direct contact with said solution.

15. The method as in claim 14, wherein the $S_E$ structured solid is in the form of a tank, tube, or bead.

16. The method as in claim 14, wherein the $S_E$ structure solid is enclosed in a container which is in fluid contact with said detergent, soap, surfactant or polymer.

17. A method of reducing the amount of detergent, soap, surfactant or polymer needed in a solution used for washing, removal of particulates or separation of solids from liquids, which comprises bringing an $L_E$ structured liquid contained in a sealed container into direct contact with the solution.

18. A method of prevention and removal, of scale from a potentially scale-forming solution which comprises injecting an $L_E$ structured liquid into said solution, said solution being used in a heat exchanger which said heat exchanger is part of a cooling tower, a boiler, a condenser or distiller.

19. A method of prevention and removal, of scale from a potentially scale-forming solution which comprises injecting an $L_E$ structured liquid into said solution, said solution being transported in a water pipe or oil pipe.

* * * * *